United States Patent
Hori et al.

[11] 3,795,290
[45] Mar. 5, 1974

[54] DRUM, RIM GRIP BRAKING DEVICE

[75] Inventors: Sadayuki Hori, Katsuta; Akira Mawake, Mito; Mitio Imanaka, Katsuta, all of Japan

[73] Assignee: Hitachi, Ltd., Tokyo, Japan

[22] Filed: Dec. 2, 1971

[21] Appl. No.: 203,963

[30] Foreign Application Priority Data
Dec. 9, 1970 Japan............................ 45-108555
Dec. 26, 1970 Japan............................ 45-118658
May 17, 1971 Japan............................ 46-32504

[52] U.S. Cl................ 188/76, 188/72.9, 188/171, 192/73, 192/90, 335/261, 335/262
[51] Int. Cl............................................. F16d 53/00
[58] Field of Search.... 188/76, 163, 171, 173, 72.6, 188/72.9; 192/73, 90; 335/261, 262, 279

[56] References Cited
UNITED STATES PATENTS

| 2,787,340 | 4/1957 | Murphy | 188/76 |
| 1,474,960 | 11/1923 | Fernow, Jr. | 188/171 |
| 2,830,679 | 4/1958 | Butler | 188/72.9 X |
| 1,978,974 | 10/1934 | Williams | 188/59 X |
| 2,876,869 | 3/1959 | Coskun | 188/59 X |

*Primary Examiner*—George E. A. Halvosa
*Attorney, Agent, or Firm*—Craig and Antonelli

[57] ABSTRACT

A braking device for elevators or the like, in which an inner shoe and an outer shoe are arranged for engagement with the inner and outer peripheral surfaces of a cylindrical flange of a brake drum respectively and said inner and outer shoes are operated to effect braking.

9 Claims, 9 Drawing Figures

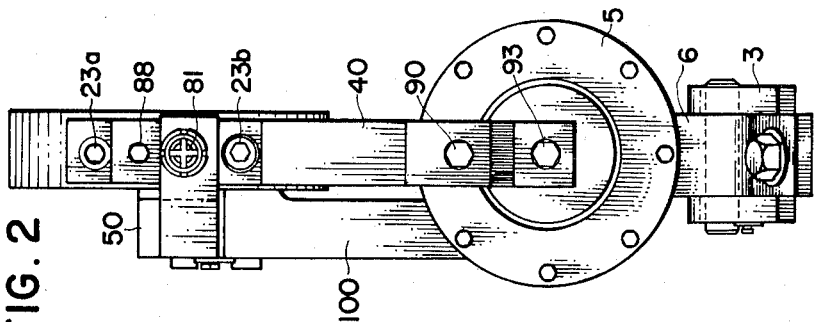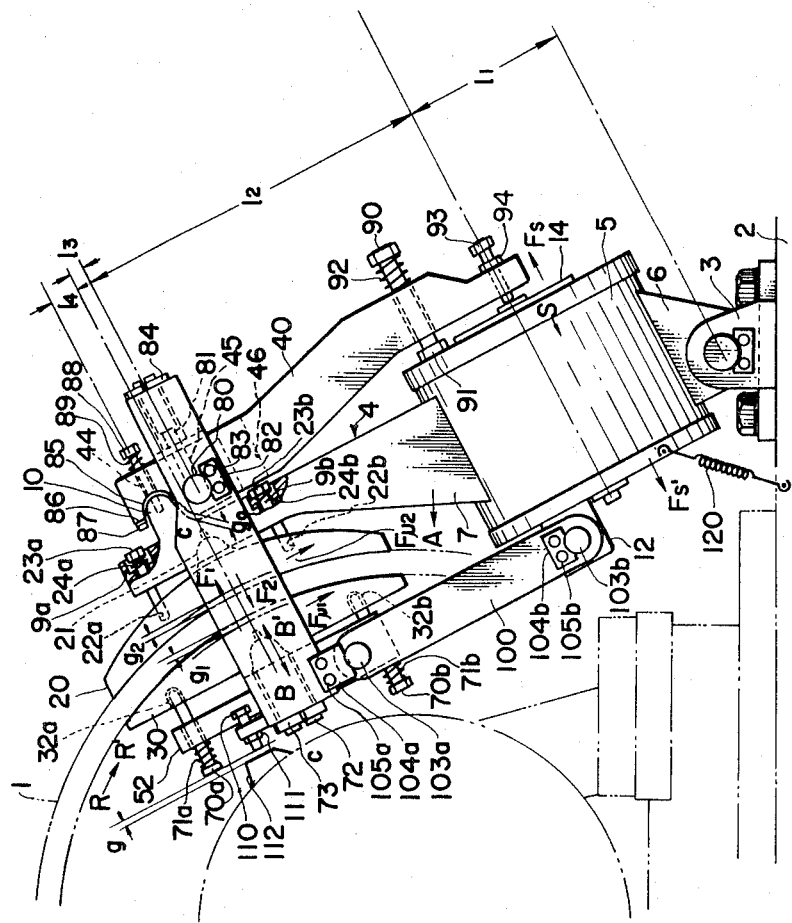

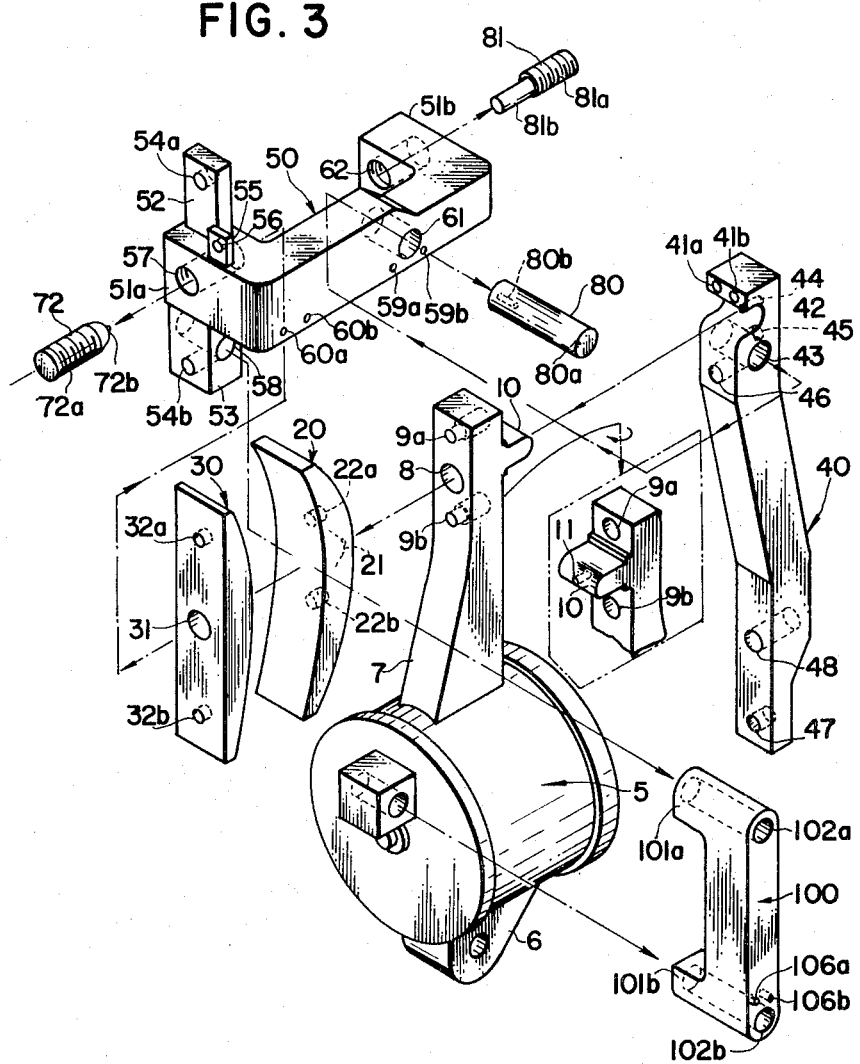

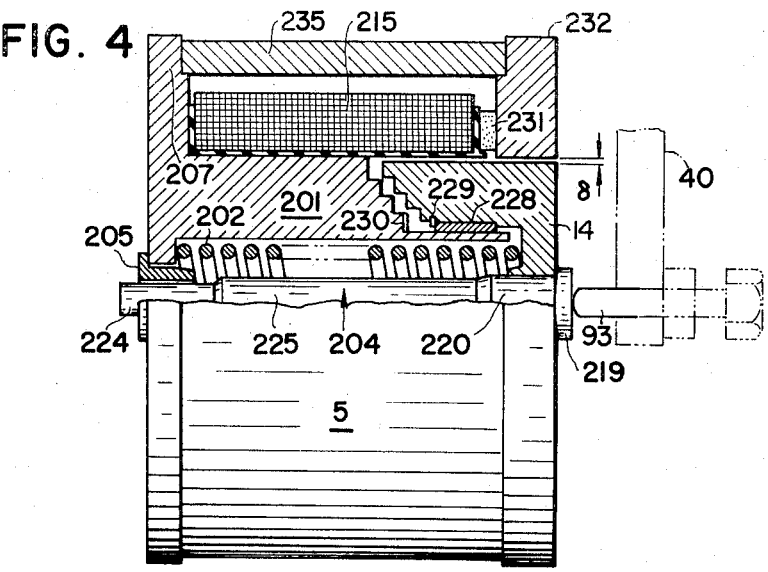
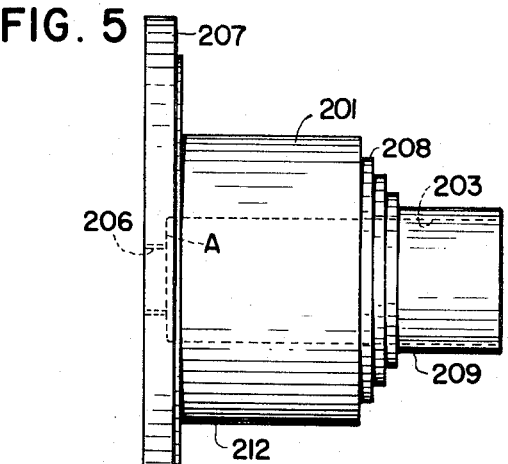
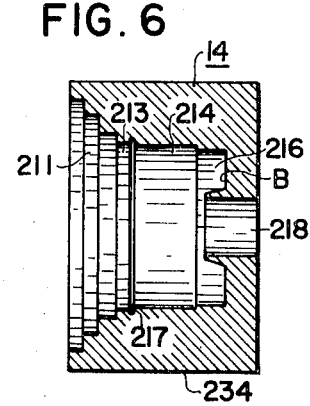
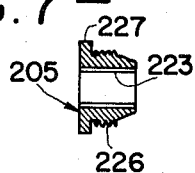
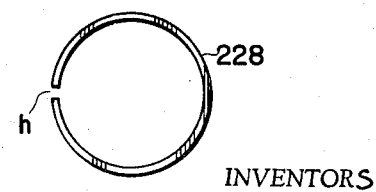

DRUM, RIM GRIP BRAKING DEVICE

This invention relates to a braking device, and more particularly to a braking device adapted for use in elevators.

Conventional braking devices for elevators has been predominantly of the type which utilizes the mechanical friction between a drum and brake shoes pressed against said drum from both sides under the biasing forces of springs.

Such prior art braking devices have had the disadvantages (1) that the strength members must be large in thickness or width so as to be resistive against deflection which tends to be large because of their large lengths, and hence become large in size and heavy in weight, (2) tha even a slight variation in the height of the axis of a motor shaft from a mounting base or a variation in the drum diameter necessitates the dimensions of the component parts of the braking device to be changed, so that the number of the kinds of component parts tend to increase, (3) that the maintenance and inspection of an electromagnet are inconvenient since the electromagnet is on the top of a winch, (4) that even a slight deviation of the set position, caused by shock or other reasons at the time of transportation and lift, makes the strokes of the left and right brake shoes non-uniform, which tends to results in an instable braking operation, and (5) that the electromagnet is required to have an attractive force equal to the sum of the pressures of the left and right brake shoes and, therefore, becomes relatively large in size.

An object of the present invention is to provide a braking device which is small in size and light in weight as a whole.

Another object of the invention is to provide a braking device which is free of the above-described disadvantages of the prior art devices.

Still another object of the invention is to provide a braking device in which the engagement and disengagement between the shoes and the drum can be effected smoothly.

Other objects and features of the invention will become apparent from the following description of an embodiment thereof when taken in conjunction with the accompanying drawings. In the drawings, FIG. 1 is a front elevational view showing the practical construction of an embodiment of the braking device according to the present invention;

FIG. 2 is a side elevational view looking to the right of FIG. 1;

FIG. 3 is an exploded view of the component parts of the braking device shown in FIGS. 1 and 2;

FIG. 4 is a sectional side view of the upper half portion of the electromagnet used in the braking device;

FIG. 5 is a side elevational view of the stationary core;

FIG. 6 is a side elevational view of movable core;

FIG. 7 is a sectional view of the slide bearing;

FIG. 8 is a side elevational view of the lining of the slide bearing; and

FIG. 9 is a front elevational view of the lining shown in FIG. 8.

Referring to the drawings and particularly to FIG. 1, a brake drum having a cylindrical flange 1 (hereinafter referred to simply as brake drum as a whole) is supported on a mounting base 2 for a winch. The mounting base 2 has a pivot bearing 3 fixedly mounted thereon.

A supporting body generally indicated by numeral 4 includes an electromagnet 5, a post 7 integrally connected to the upper side of said electromagnet 5 and a projection 6 integrally connected to and extending downwardly from the lower side of said electromagnet 5. This supporting body 4 is pivotably mounted on the pivot bearing 3 at the projection 6 by means of a pin. The upper portion of the post 7 is formed with a hemispherical recess 8 (FIG. 3) and stepped bores 9a, 9b located above and below said hemispherical hole 8 in symmetrical relation. Further, on the right side face of the upper portion of the post 7 is formed a semicylindrical projection 10 which is located intermediary of the stepped bore 9a and the hemispherical recess 8, and a threaded bore 11 is formed through the center of said semicylindrical projection 10, extending at right angles to the post 7.

Exteriorly of the brake drum 1 is disposed an outer brake shoe 20 for frictional engagement with the outer peripheral surface of said brake drum. This outer brake shoe 20 has a hemispherical projection 11 formed at the center of the outer face thereof, i.e. of the face remote from the brake drum 1, which is received in the hemispherical recess 8 in the post 7. It also has threaded holes 22a, 22b formed in the same side face thereof, which are located above and below the hemispherical projection 21 in symmetrical relation. Suspension bolts 23a, 23b extend through the stepped bores 9a, 9b in the post 7 and screwed into the threaded holes 22a, 22b in the brake shoe 20 respectively. The suspension bolts 23a, 23b have coil springs 24a, 24b mounted thereon which are compressed between the steps of the stepped bores 9a, 9b and the heads of said bolts 23a, 23b with suitable compressive force, respectively. Thus, the brake shoe 20 is supported on the post 7 and automatically aligned with the brake drum by the bolts 23a, 23b and the coil springs 24a, 24b.

An inner brake shoe 30 is disposed interiorly of the brake drum 1 for frictional engagement with the inner peripheral surface thereof. This inner brake shoe 30 has a hemispherical recess 31 (FIG. 3) formed at the center of the inner face thereof, i.e. of the face remote from the brake drum 1, and also has in the same side face threaded holes 32a, 32b which are located above and below said hemispherical recess 31 in symmetrical relation.

An operating lever 40 has threaded holes 41a, 41b formed in the inner face (the left side face as viewed in FIG. 1) of the upper portion thereof and also has a semicylindrical recess 42 in the same side face in which is received the semicylindrical portion 10 of the post 7. Immediately below the semicylindrical recess 42 is formed a bore 43 extending laterally through the operating lever 40 in the same direction as the direction of said semicylindrical recess. Horizontal bores 44, 45 are formed in the right side face of the upper portion of the operating lever 40 at right angles to and toward the centers of the semicylindrical recess 42 and the lateral bore 43 respectively, and a horizontal bore 46 is formed below said horizontal bore 45 in alignment with the stepped bore 9b of the post 7. The lower portion of the operating lever 40 is formed with a threaded bore 47 in alignment with a movable core 14 of the elctromagnet 5 and also with a bore 48 directing toward an outer shell of said electromagnet.

A supporting member 50 has a substantially U-shape, and the inner brake shoe 30, the brake drum 1, the outer brake shoe 20, the post 7 and the operating lever 40 are disposed between two arms 51a, 51b thereof. The arm 51a has integral upright projections 52, 53 extending upwardly and downwardly therefrom respectively. These projections respectively have bores 54a, 54b formed therethrough in alignment with the threaded holes 32a, 32b of the inner brake shoe 30. A small projection 55 provided on the upper side of the arm 51a is formed with a threaded bore 56. This small projection 55 may be substituted by the projection 52. The arm 51a has a threaded bore 57 formed therethrough in alignment with the hemispherical recess 31 of the inner brake shoe 30. The projection 53 further has a bore 58 formed therethrough for receiving a connecting link to be described later. The right and left sides of the front face of the supporting member 50 are formed with threaded holes 59a, 59b and 60a, 60b respectively, and the right side of the same is further formed with a bore 61. The arm 51b is formed with a threaded bore 62.

Suspension bolts 70a, 70b are extended through the bores 54a, 54b of the upright projections 52, 53 and screwed into the threaded holes 32a, 32b of the inner brake shoe 30 respectively. These suspension bolts 70a, 70b have coil springs 71a, 71b mounted thereon which are compressed between the heads of said bolts and the left side faces of the upright projections 52, 53 with suitable compressive force respectively (FIG. 1). An adjusting screw 72, as shown in FIG. 3, has a threaded portion 72a and a hemispherical end 72. This adjusting screw 72 is screwed into the threaded bore 57 of the arm 51a with its hemispherical end 72b received in the hemispherical recess 31 of the inner brake shoe 30, and is fixed in position by a lock nut 73. Thus, the inner brake shoe 30 is pressed against the hemispherical end 72b of the adjusting screw 72 and automatically aligned with the brake drum. The position of the inner brake shoe 30 in the direction B—B' can be adjusted by adjusting the amount of insertion of the adjusting screw 72 and thereby the fabrication errors of the machine parts can be compensated.

A connecting pin 80 has a slit 80a formed near an end face thereof and also has a flat cutout 80b formed in one side face thereof at right angles to and rearwardly of said slit 80a, as shown in FIG. 3. A supporting screw 81 has a threaded portion 81a and a blank portion 81b as shown in FIG. 3. The connecting pin 80 is extended through the bore 61 of the supporting member 50 and loosely received in the lateral bore 43 of the operating lever 40. In the slit 80a of the connecting pin 80 is received a stopper plate 82 which is secured to the supporting member 50 by means of bolts 83. The supporting screw 81 is screwed into the threaded bore 62 of the arm 51b with the end face of the blank portion 81b thereof abutting against the flat cutout 80b of the connecting pin 80. The supporting screw 81 is fixed in position by a lock nut 84.

Between the semicylindrical projection 10 of the post 7 and the semicylindrical recess 42 of the operating lever 40 is interposed a bearing sheet 85 which has a hole formed through the center thereof, and a stopper plate 86 is provided to prevent a displacement of said bearing sheet 85, which is fixed in position by bolts 87 screwed into the threaded holes 41a, 41b at the upper portion of the operating lever 40 respectively. An operating lever supporting bolt 88 is extended through the bore 44 of the operating lever 40 and the hole in the bearing sheet 85, and screwed into the threaded hole 11 of the semicylindrical projection 10 of the post 7. This bolt 88 has a coil spring 89 mounted thereon which is compressed between the head of said bolt and the right side face of the operating lever 40 with suitable compressive force. Thus, the operating lever 40 is rockably supported on the semicylindrical projection 10 of the post 7 under the biasing force of the coil spring 89, with said semicylindrical projection 10 received in the semicylindrical recess 42 with the bearing sheet 85 interposed therebetween. It will, therefore, be understood that the operating lever 40 and the arm 51b are freely rockable to some extent about the semicylindrical projection 10.

As shown in FIG. 1, a bolt 90 is loosely extended through the bore of the operating lever 40 and screwed into a threaded hole (not shown) formed in the outer shell of the electromagnet 5, and secured in position by means of lock nut 91. This bolt 90 has a coil spring 92 mounted thereon which is compressed between the right side face of the operating lever 40 and the head of said bolt with suitable compressive force, and by which the end of a bolt 93 is prevented from detaching from the movable core 14 at the time of energization and deenergization of the electromagnet 5, said bolt 93 being screwed into the threaded bore 47 of the operating lever 40 and fixed in position by means of a lock nut 94, with its end in contact with the movable core of said electromagnet 5. This bolt 93 serves to transmit the movement of the movable core 14 to the operating lever 40.

The supporting member 50 and the electromagnet 5 are operatively connected with each other by means of a substantially U-shaped link 100 striding over the brake drum 1. Namely, the upper bent end 101a of the link 100 is formed with a lateral bore 102a and connected with the downward projection 53 of the supporting member by means of a pin 103a extending through said lateral bore 102a and the bore 58 of said projection 53, while the lower bent end 101b of the same is formed with a lateral bore 102b and connected with a projection 12 of the electromagnet by means of a pin 103b extending through said lateral bore 102b and a bore 13 formed through said projection 12. The pins 103a, 103b are secured in position by stopper plates 104a, 104b which are received in slits formed in said respective pins and secured to the link 100 by bolts 105a, 105b which are screwed into the threaded holes 60a, 60b and 10 formed in the supporting member 50 and threaded holes 106a, 106b formed in the lower portion of the link 100, respectively.

A bolt 110 is screwed through the threaded bore 56 formed through the projection 55 of the supporting member 50 and fixed in position by a lock nut 111. The position of this bolt 110 is 50 selected that a gap $g$ may be maintained between it and a projection 112 formed on the winch at the time of braking.

The braking device of the construction described above is inclined as shown in FIG. 1 and, therefore, subjected to gravitational rotating force in the direction of the arrow A. Therefore, when the electromagnet is excited (the braking force is relieved), the entire braking device pivots under said gravitational rotating force, until the end of the bolt 110 abuts against the projection 112, and thus a suitable gap $g_1$ is provided between the brake drum 1 and the inner brake shoe 30.

Now, the operation of the embodiment described above will be described.

When the braking device is in a braking position shown in FIG. 1, the force $Fs$ of a coil spring (not shown), previously incorporated in the electromagnet 5 in a compressed state, is transmitted through the movable core 14 and the bolt 93 to the operating lever 40. This force is enlarged to $$Fs \times (l_2 + l_3 + l_4)/(l_3 + l_4) \ (= F_1)$$

by virtue of the lever ratio of the operating lever 40 and applied to the inner brake shoe 30 through the supporting member 50, the connecting pin 80, the screw 81, the arm 51a, the arm 51b and the adjusting screw 72 in the order mentioned, urging said inner brake shoe into frictional engagement with the inner surface of the brake drum 1. In the formula given above, $l_1$ represents the distance between the center of the pin connecting the downward projection 6 of the supporting body 4 with the pivot bearing 3, and the center of the bolt 93, $l_2$ the distance between the center of the bolt 93 and the centers of the screws 81 (or the connecting pins 80); $l_3$ the distance between the centers of the screw 81 (or the connecting pin 80) and the centers of the hemispherical projection 21 (or the adjusting screw 72) and $l_4$ is the distance between the centers of the hemispherical projection 21 (or the adjusting screw 72) and the centers of the bolt 88 (or the semicylindrical projection 10). The ratio between $(l_2 + l_3 + l_4)$ and $(l_3 + l_4)$ becomes small when the latter is made relatively large. The connecting pin 80 can be made large in diameter by reducing the enlarging ratio ($F_1/Fs$), and in this case, the braking device is sufficiently durable strengthwise even when the mechanism associating with the arm 51b and the screw 81 are omitted. However, the enlarging ratio is increased by making $l_3 + l_4$ small, the diameter of the connecting pin 80 necessarily becomes small, resulting in a strength reduction. Therefore, it is advantageous to provide the strong arm 51b and screw 81.

When the braking force is applied to the inner brake shoe 30, the outer brake shoe 20 undergoes the sum of the force brought about by $F'_1$ corresponding to the reaction of $F_1$, i.e.

$$F'_1 \times (l_1 + l_2)/(l_1 + l_2 + l_3),$$

and the force generated by the other force $F's \ (= Fs)$ of the coil spring incorporated in the electromagnet 5, i.e.

$$Fs \times l_1/(l_1 + l_2 + l_3),$$

and pressed against the outer surface of the brake drum 1 (the force of the coil spring 92, the gravitational forces of thee component parts and the frictional forces at the sliding portions of the respective pins are small relative to the $Fs$ and hence omitted). Namely, by the force $Fs$ of the coil spring incorporated in the electromagnet 5, the force $$F_1 = Fs \times (l_2 + l_3 + l_4)/(l_3 + l_4)$$

is applied to the inner brake shoe and the force $$F_2 = F'_1 \times (l_1 + l_2)/(l_1 + l_2 + l_3) + F's \times l_1/(l_1 + l_2 + l_3)$$
$$= Fs \times [(l_2 + l_3 + l_4)(l_1 + l_2) + l_1(l_3 + l_4)]/[(l_3 + l_4)(l_1 + l_2 + l_3)]$$

is applied to the outer brake shoe.

Supposing that the winch is rotating or an unbalanced load is exerted on the winch in the direction of the arrow R—R', mechanical frictional force occurs between the winch and the brake drum 1. With $\mu$ representing the coefficient of friction, the inner brake shoe 30 undergoes frictional force $F\mu_1 = \mu F_1$ and the outer brake shoe undergoes frictional force $F\mu_2 = \mu F_2$, which forces act as braking force. The braking frictional force $\mu F_1$ is transmitted to the supporting body 4 through the adjusting screw 72, the arm 51a, the downward projection 53, the pin 103a, the connecting link 100, the pin 103b and the projection 12 of the electromagnet 5. Similarly, the braking frictional force $\mu F_2$ of the outer brake shoe 20 is transmitted to the supporting body 4 through the hemispherical projection 21. Therefore, the bearing 3 and the mounting base 2 are subjected to the sum of them. On the other hand, when the winch rotates or the unbalanced load is exerted on the winch in a direction opposite to the direction R—R', the braking frictional forces $\mu F_1$ and $\mu F_2$ act in the opposite directions to those mentioned above respectively.

When the electromagnet 5 is excited, attractive force stronger than the force $Fs$ of a brake spring acts between a stationary core 201 (FIG. 4) and the movable core 14, and the movable core 14 is attracted a distance $s$. Therefore, the operating lever 40 pivots about the semicylindrical projection 10 the same distance $s$ under the biasing force of the coil spring 92 (or the gravity of the operating lever where the entire braking device is mounted at an angle as shown in FIG. 1), with the end of the bolt 93 being held in contact with the movable core 14, in the same direction as the movable core 14. As a result, the gap $Go$ initially provided between the post 7 of the supporting body 4 and the operating lever 40, on the line connecting the centers of the inner brake shoe 30 and the outer brake shoe 20, is decreased to G. Therefore, a gap represented by the following formula is formed between the brake drum 1 and the inner brake shoe 30 and between the brake drum 1 and the outer brake shoe 20, thus relieving the braking force.

$$Go - G = g_1 + g_2 = s \times l_4/(l_2 + l_3 + l_4)$$

wherein $g_1$ is the gap between the inner brake shoe 30 and the brake drum 1 and $g_2$ is the gap between the outer brake shoe 20 and the brake drum 1. In practice, however, the stroke $s$ of the movable core 14 is taken to some extent by the restoration of a slight deflection of the operating lever 40 or supporting member 50, and the following relation is established:

$$Go - G < g_1 + g_2 < s \times l_4/(l_2 + l_3 + l_4)$$

When the entire braking device is installed in a slightly inclined position as shown in FIG. 1, the inner brake shoe 30 only is disengaged from the brake drum at first, during the braking force relieving operation of the brake device, under the gravity of the entire braking device, until the end of the bolt 110 extending through the small projection 55 of the supporting member 50 abuts against the projection 112 of the winch, and thereafter the gap $g_2$ is formed between the brake drum 1 and the outer brake shoe 20. Therefore, it may be considered that $g = g_1$.

Where the gravity of the entire braking device cannot be utilized for the disengagement of the inner brake shoe 30 from the brake drum 1, by reason of the installation space or other reasons, suitable means is provided such as a tension spring 120 optionally stretched between the outer shell of the electromagnet 5 and the mounting base 2 as shown in FIG. 1, whereby the same effect as that of the gravity of the braking device can be obtained.

In the braking device of the invention, as described above, a smooth braking of the braking drum can be attained by the outer and inner brake shoes supported in the automatically aligned fashion and said brake shoes can be positively disengaged from the brake drum at the time when the braking force is to be relieved. Further, since the electromagnet is disposed at the lower portion of the braking device and the movement of the movable core is transmitted to one operating lever, the maintenance and inspection of the electromagnet are facilitated and said electromagnet can be relatively small in capacity. Furthermore, since the component parts can be small in size, the size of the entire braking device can be reduced and the production cost thereof can also be reduced.

Now, the construction and operation of an electromagnet adapted for use in the inventive braking device will be described with reference to FIGS. 4 to 9.

A stationary core 201 has an axial bore 203 as shown in FIG. 5 for mounting a brake spring 202 therein, and a threaded bore 206 is formed through the center of the bottom wall of said axial bore, in which a bearing 205 for supporting a transmission rod 204 is threadably mounted. The stationary core 201 further has a flange 207, a cylindrical wall 212 of a relatively large thickness adapted to be received in the axial hollow of a solenoid 215, a concentrically stepped portion 208 integral with and projecting from said cylindrical wall 212 for mating engagement with a concaved concentrically stepped portion 211 of a movable core 14, and a cylindrical wall 209 integral with and projecting from said concentrically stepped portion 208.

The spring 202 is made of a non-magnetic material and mounted in the axial bore of the stationary core 201, with one end thereof bearing against the bottom wall or spring seat A of said axial bore and the other end bearing against the bpttom wall or spring seat B of an axial hollow of a movable core 14, in a suitably compressed state. The transmission rod 204 is extended through the spring 202. The axial bore of the movable core 14 is made up of cylindrical bore sections 213, 214, 216 arranged concentrically for receiving the relatively thin walled cylindrical portion 209 of the stationary core 201, and annular groove 217 of a small width is formed between the bore sections 213 and 214. Further, a hole 218 is bored through the center of the bottom wall of the axial bore of the movable core 210, as illustrated in FIG. 6, for the insertion of the transmission rod 204 therethrough. The transmission rod 204 is made of a non-magnetic material and made up of a head or flange 219, a first section 220 adapted to fit in the through-hole 218 of the movable core 14, a second section 224 adapted to be loosely received in the inner surface of the bearing 205 to be supported thereby, and a third section 225 of a diameter intermediary of the diameters of said first and second sections.

As illustrated in FIG. 7, the bearing 205 has a flange 227 and external threads 226 formed on the outer surface thereof, and is screwed into the threaded hole of the stationary core 201 until the flange 227 abuts against the outer surface of the flange 207 of the stationary core.

Referring to FIGS. 8 and 9, a bearing ring 228 is made of a non-metallic material, such as high polymer and somewhat flexible, and has a slit $h$ formed at a portion thereof. This bearing ring 228 is disposed in the bore section 214 of the movable core 14 as shown in FIG. 4, to support the thin walled portion 209 of the stationary core 201 in sliding engagement therewith, and fixed in position by a stopper ring 229 disposed in the annular groove 217 of the movable core, so that it will not allowed to make a large sliding movement or move off the position when the electromagnet is actuated.

A non-magnetic ring 230 of a small thickness is mounted on the thin walled portion of the stationary core 201, which, when the electromagnet is actuated, will be interposed between both cores to maintain said cores in slightly spaced relation to each other. Reference numeral 231 designates an electric member by which the solenoid 215 is secured position with a suitable pressure.

An end plate 232 is circular in shape and has a central opening in which the movable core 14 is received with a suitable gap $\delta$ between the outer surface 234 of said movable core and the peripheral surface of said central opening. In normal condition, there is provided a gap 233 between the movable core 14 and the stationary core 201 as shown in FIG. 4, so that, when the solenoid 215 is exited, the movable core 14 may be attracted toward the stationary core. The flange 207 of the stationary core and the end plate 232 are respectively secured to the opposite ends of a cylindrical yoke 235 made of a magnetic material. A transmission bolt 93 which transmits the force of the coil spring 202 as a braking force is held in contact with the head or flange 219 of the transmission rod 204 at one end thereof.

The electromagnet of the construction described above operates as follows. Namely, when the solenoid 215 is excited in the state shown in FIG. 5, magnetically attractice force acts between the confronting surfaces of the portion 208 of the stationary core 201 and the portion 211 of the movable core 14, and the movable core is attracted toward the stationary core against the force of the compressed spring 202. Since the first section 220 of the transmission rod 204 is tightly fitted into the central hole 218 of the movable core, the movable core slidably moves integrally with the transmission rod 204, with the bearing 228 disposed in the axial bore thereof sliding on the thin walled portion 209 of the stationary core and with the second section 224 of the transmission rod 204 being guided by the bearing 205. Thus, the braking force of the braking device is relieved.

On the other hand, when the solenoid 215 is deenergized, the movable core 210 is moved in the opposite direction, integrally with the transmission rod 204, under the biasing force of the spring 202 to the position shown in FIG. 5, whereby the braking device is actuated through the operating lever 40 by the force of said spring.

What is claimed is:

1. A braking device comprising a brake drum supported on a mounting base and having a flange, inner and outer brake shoes arranged for engagement with the inner and outer surfaces of the flange of said brake drum, means for bearing braking force generated by engagement of said flange and said inner and outer shoes, said bearing means having one end portion connected with said inner and outer shoes and the other end portion connected with said mounting base, means for generating force which brings said inner and outer shoes into and out of engagement with said flange including electromagnetic means with spring means, said force generating means forming a part of said bearing means, and means for transmitting the force generated by said force generating means to said inner and outer shoes, said electromagnetic means including an electromagnet having an integral projection extending downwardly from the lower side thereof and pivotally connected with a bearing on a mounting base and an integral post extending upwardly from the upper side thereof and having said outer brake shoe rockably connected to the inner face thereof through a spherical joint; said transmitting means including an operating lever having its lower end held in contact with a movable core of said electromagnet, its intermediate portion connected with an outer shell of said electromagnet and its upper end rockably connected to the outer face of said post through a spherical joint at a location above the spherical joint between said post and said outer brake shoe, a supporting member having a substantially U-shape so as to accommodate said inner brake shoe, said outer brake shoe and said post between the two arms thereof and rockably supporting said inner shoe by one of said arms, with the other arm connected to said operating lever, and a link having one end pivotably connected with electromagnet and the other end pivotably connected with the inner shoe supporting arm of said supporting member.

2. A braking device according to claim 1, in which said inner and outer brake shoes, said electromagnet, said supporting member and said link are arranged in an assembly which is inclined toward the brake drum with respect to the normal line passing the center of said bearing on the mounting base.

3. A braking device according to claim 1, in which said electromagnet comprises a flanged stationary core having an axial bore, a movable core having an axial bore communicating with the axial bore of said stationary core, an end plate having a central hole in which said movable core is slidably movably mounted, a cylindrical yoke connecting the flange of said stationary core and said end plate with each other, a braking force relieving solenoid surrounding the confronting portions of said stationary and movable cores, a compressed spring disposed in the axial bores of said stationary and movable cores, a non-magnetic transmission rod extending through said spring with one end thereof secured to said movable core and the other end journaled in a bearing mounted in the center of the flange of said stationary core and a bearing ring fitted in that portion of the axial bore of said movable core in which a thin walled cylindrical portion of said stationary core is slidably received, said bearing ring being made of a non-metallic material and having a slit formed at a portion thereof so as to be flexible to some extent.

4. A braking device according to claim 1 wherein said inner shoe supporting arm includes two projections extending in opposite directions for mounting said inner brake shoe.

5. A braking device according to claim 1 wherein means for adjusting the distance between said inner and said outer brake means and said flange are provided on said integral post and said substantially U-shaped supporting member.

6. A braking device according to claim 1 wherein said link is a substantially U-shaped link, one leg thereof being pivotally connected to an outer shell of said electromagnet and the other leg thereof being connected to said inner shoe supporting arm.

7. A braking device according to claim 1 wherein said electromagnet further includes a flanged stationary core having an axial bore, a movable core having an axial bore communicating with the axial bore of said stationary core, means surrounding confronting portions of said stationary and movable cores for relieving the braking force, and wherein said spring means includes a compressed spring disposed in the axial bores of said stationary and movable cores, and a non-magnetic transmission rod extending through said spring with one end secured to said movable core and the other end journaled in a bearing mounted in the center of the flange of said stationary core.

8. A braking device according to claim 1 wherein said spherical joint connecting said operating lever with said outer face of said post includes a recess provided on the upper end of said operating lever and a projection provided on said outer face of said post, said recess being engageable with said projection.

9. A braking device according to claim 8 wherein said recess is provided with a bearing sheet.

* * * * *